Fig. 2

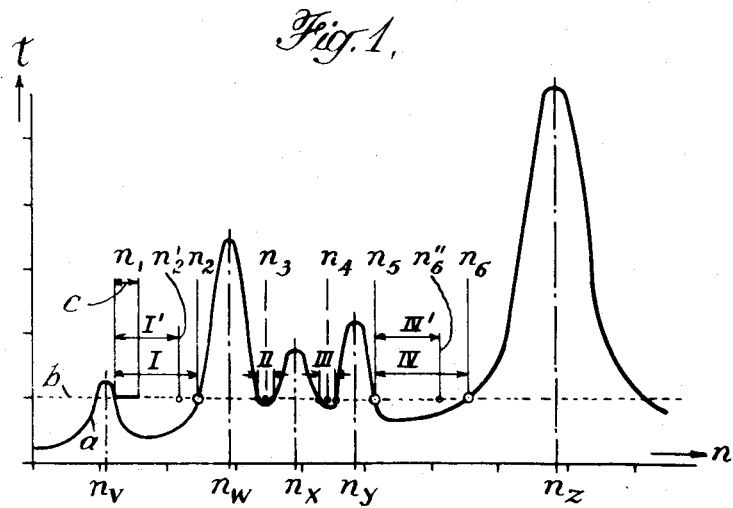
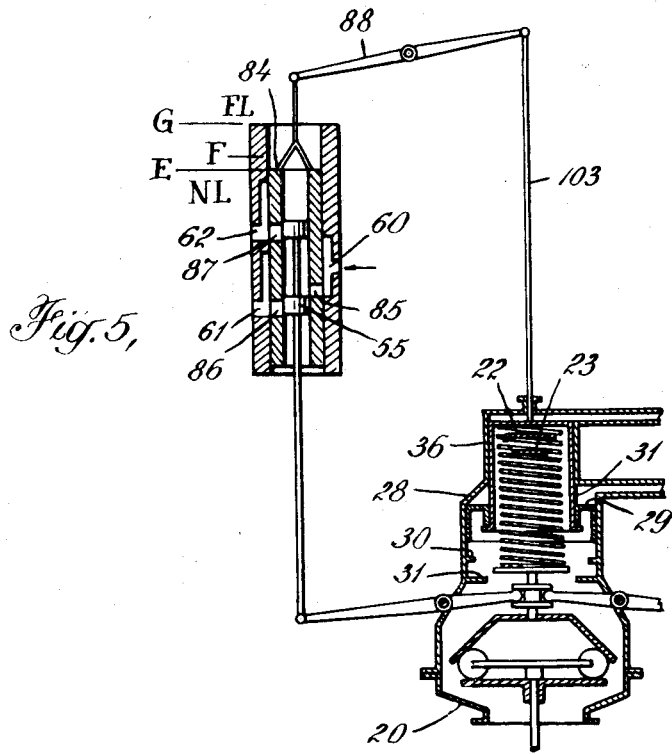

Nov. 9, 1937.    O. SCHLÄPFER    2,098,761
REGULATING DEVICE FOR A COMBUSTION POWER ENGINE
COUPLED TO AN ELECTRIC GENERATOR FOR VEHICLES
Filed June 26, 1936    4 Sheets-Sheet 4

INVENTOR
Oskar Schläpfer
BY
Pennie, Davis, Marvin & Edmonds
HIS ATTORNEYS

Patented Nov. 9, 1937

2,098,761

UNITED STATES PATENT OFFICE 2,098,761

REGULATING DEVICE FOR A COMBUSTION POWER ENGINE COUPLED TO AN ELECTRIC GENERATOR FOR VEHICLES

Oskar Schläpfer, Winterthur, Switzerland, assignor to Sulzer Freres, Societe Anonyme, Winterthur, Switzerland Application June 26, 1936, Serial No. 87,449
In Switzerland July 8, 1935

12 Claims. (Cl. 290—17)

The invention relates to a regulating device for a combustion engine coupled to an electric generator for vehicles with a speed governor for the combustion engine, which is provided with elements, for example, springs, which can be brought into action, and which, when the combustion engine is switched over from one speed range to the other, are brought into action, and consists in that, in addition to the device to put the regulating springs of the speed governor in or out of action, there is provided a device which automatically regulates the voltage of the generator in such a way that the selected output of the combustion engine is maintained at least approximately constant. Advantageously the device regulating the voltage of the generator has a resistance regulating the excitation of the generator which is regulated by the speed governor, or is regulated in dependence on the generator current. Furthermore, the device to put the regulating springs of the speed governor in or out of action can operate a blocking element, which in accordance with a magnitude characteristic of the traction operation, i. e. a characteristical value of the traction operation, for example, the current or voltage conditions or both in the circuit connecting the generator to the driving motors, prevents a switching or connecting in.

In regulating the speed of the vehicle by hand-operated regulation of the voltage of the generator by the vehicle driver, the load on the combustion engine cannot in general be observed accurately. Thus, when passing over from a large to a smaller grade without change of the voltage of the generator, the load on the combustion engine decreases. Without simultaneous automatic regulation of the fuel supply, the speed of the combustion engine and of the generator would be increased to an extent that could not be determined in advance, and there would exist the danger that the combustion engine would work for a rather long time in the region of a critical speed. For this reason, in the case of hand-operated voltage regulation, the automatic regulation of the fuel supply to the combustion engine in dependence on its speed, is necessary so that for each operating engine speed a definite regulation range is necessary in order that the speed governor can regulate the output of the combustion engine between full load and no load.

For the reason that combustion engines for driving vehicles very often show several critical speeds within the total range of all operating speeds, the speed ranges between the critical speeds can be better utilized if, by maintaining constant the selected output of the combustion engine for the upper operation speeds, the necessity to provide a range of speed between full load and no load at each of the upper operating speeds is avoided, which is accomplished by the automatic regulation of the voltage of the generator. This also results in a simplification of the work of operating the vehicle. The arrangements of operating speeds in the immediate vicinity of critical speeds require furthermore in certain cases special protective devices inasmuch as the switching over from one speed of the combustion engine to the other is controlled in accordance with a magnitude characteristic of the traction operation, in order to avoid endangering the combustion engine on sudden relieving of load or loading of the generator.

Examples of practical embodiments of the invention are shown in the drawings.

Figure 1 shows the relation of operating speeds in connection with the ranges of the critical speeds;

Figure 2 is the diagram of a combustion engine coupled to an electric generator for vehicles, the speed governor of which adjusts the resistance for regulating the excitation of the generator;

Figure 5 is an enlarged sectional view of the governor of Figure 2, showing a modified control connection between the governor and the generator excitation control means.

Figure 3:
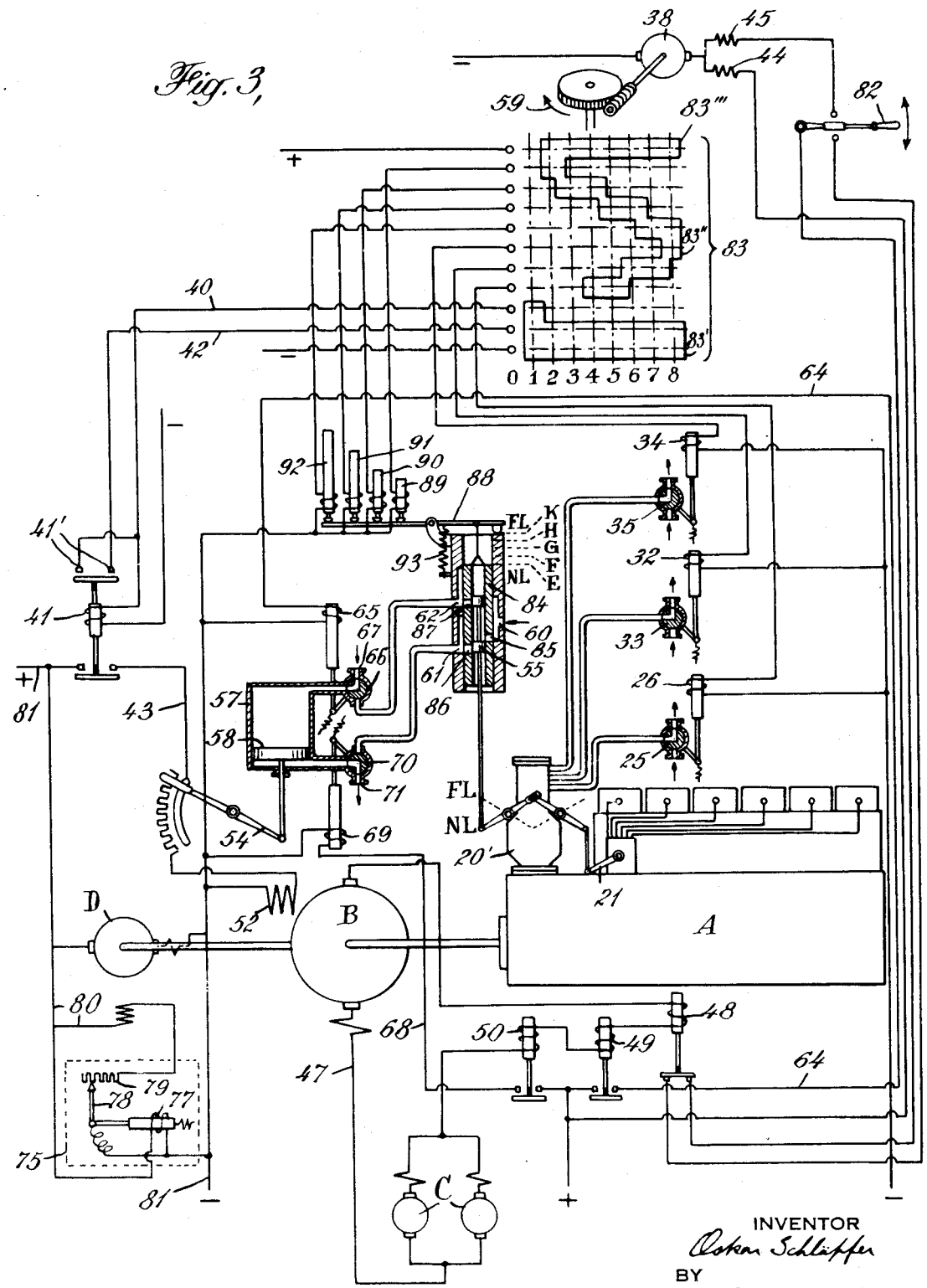
Figure 3 is the diagram of an arrangement with a control switch for adjusting the rotational speed as well as the torque of the combustion engine.

In Figure 1 the curve $a$ shows the additional stress of the crank shaft due to torsional vibrations within the total range of the operation speeds $n$ of a combustion engine for a vehicle with electric power transmission. At the different critical speeds $n_r$—$n_x$ the curve $a$ rises above the line $b$, which represents the permissible additional stress. In the range of the peaks cut off by the line $b$, the additional stress surpasses the permissible value and no operating speeds can lie within the corresponding speed ranges. In the case of hand-operated regulation of the generator voltage, there results, for each operating speed of the combustion engine, a speed range which is determined by the degree of non-uniformity of the speed governor of the combustion engine, which speed range is greater at the higher speeds than at the lower.

Now however, the sections II and III in the total speed range are smaller between the critical speeds $n_w$ and $n_x$ and $n_x$ and $n_y$ than the necessary regulating ranges corresponding to the degree of non-uniformity at the speed $n_3$ and $n_4$. Therefore, in hand-operated voltage regulation of the whole range from $n_1$ to $n_6$, only the sections I' and IV' come into consideration for operating speeds. The large section from $n_2$ to $n_5$ could not be used at all accordingly.

When the outputs of the combustion engine are kept constant on the other hand, operating speeds may also be provided in the sections II and III. Instead of the sections I' and IV' there come into consideration the larger sections I and IV, because the parts of the sections I and IV projecting above the sections I' and IV' are no longer required for the output regulation between full load and no load when output is maintained constant. In this kind of regulation, which requires a regulating range solely at the lowest operating speed, a uniform and unbroken distribution of several operating speeds over the entire range of operating speeds is possible even in the case of critical speeds that are close to each other.

Figure 2:
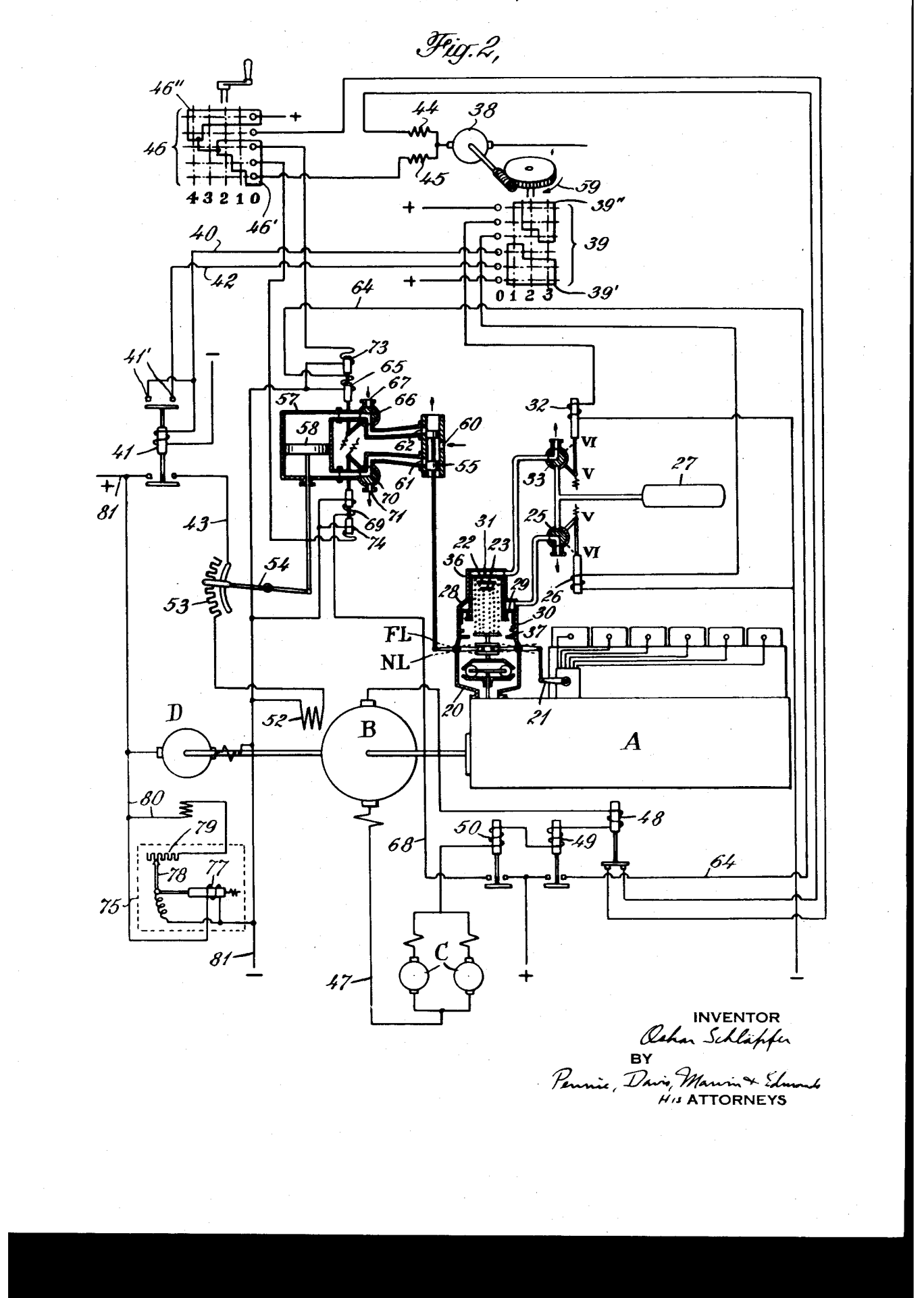

In Figure 2, the combustion engine A drives the generator B which supplies current to the driving motors C. The excitation current for the generator B is supplied by the exciter machine D, which can be driven by the combustion engine A or can have an individual drive. The fuel supply to the combustion engine A is regulated by the speed governor 20 by means of the adjusting element 21. The governor 20 is provided with additional springs 22 and 23 which are automatically connected in i. e. brought into action when the combustion engine A is switched over from one speed range to another. On turning the valve 25 from V to VI by putting current into the solenoid 26, compressed air from the tank 27 is admitted into the cylinder 28 above the piston 29. Thereby the piston 29 goes down as far as the stop 30, carrying along the piston 31, and the spring 22 is connected in. If by supplying current to the solenoid 32 the valve 33 is turned so that compressed air enters the cylinder 36 above the piston 31, then the latter is pressed down still further as far as the stop 37, and the spring 23 is connected in. If the solenoids 26 and 32 carry no current, then the valves 25 and 33 turn back, under the influence of a weight or a spring, into the position shown in the drawings in which the cylinder chambers above the pistons 29 and 31 are connected to the atmosphere. The compressed air escapes and the pistons 29 and 31 go back into the position shown in the drawings while the springs 22 and 23 are disconnected.

The control drum 39 driven by the motor 38 controls the current for the solenoids 26 and 32 and for the contactor 41 in the exciter circuit 43. The motor 38 with the field windings 44 and 45 for opposite directions of rotation is controlled by means of the controller 46. A relay 48 controlling the motor 38 and the relays 49 and 50 are provided in the armature circuit 47 of the generator B.

In the exciter circuit 43 are inserted the excitation winding 52 of the generator B and the variable resistance 53 with the contact lever 54. The governor 20 actuates the slide valve 55 of the servomotor 57, the piston of which, 58, is connected to the contact lever 54.

In the 0-position of the controller 46, the motor 38 is connected to the source of current by the contact segment 46' via the field winding 45, whereby the motor 38 turns the control drum 39 against the direction of the arrow 59 or holds it in the neutral position.

Figure 4:
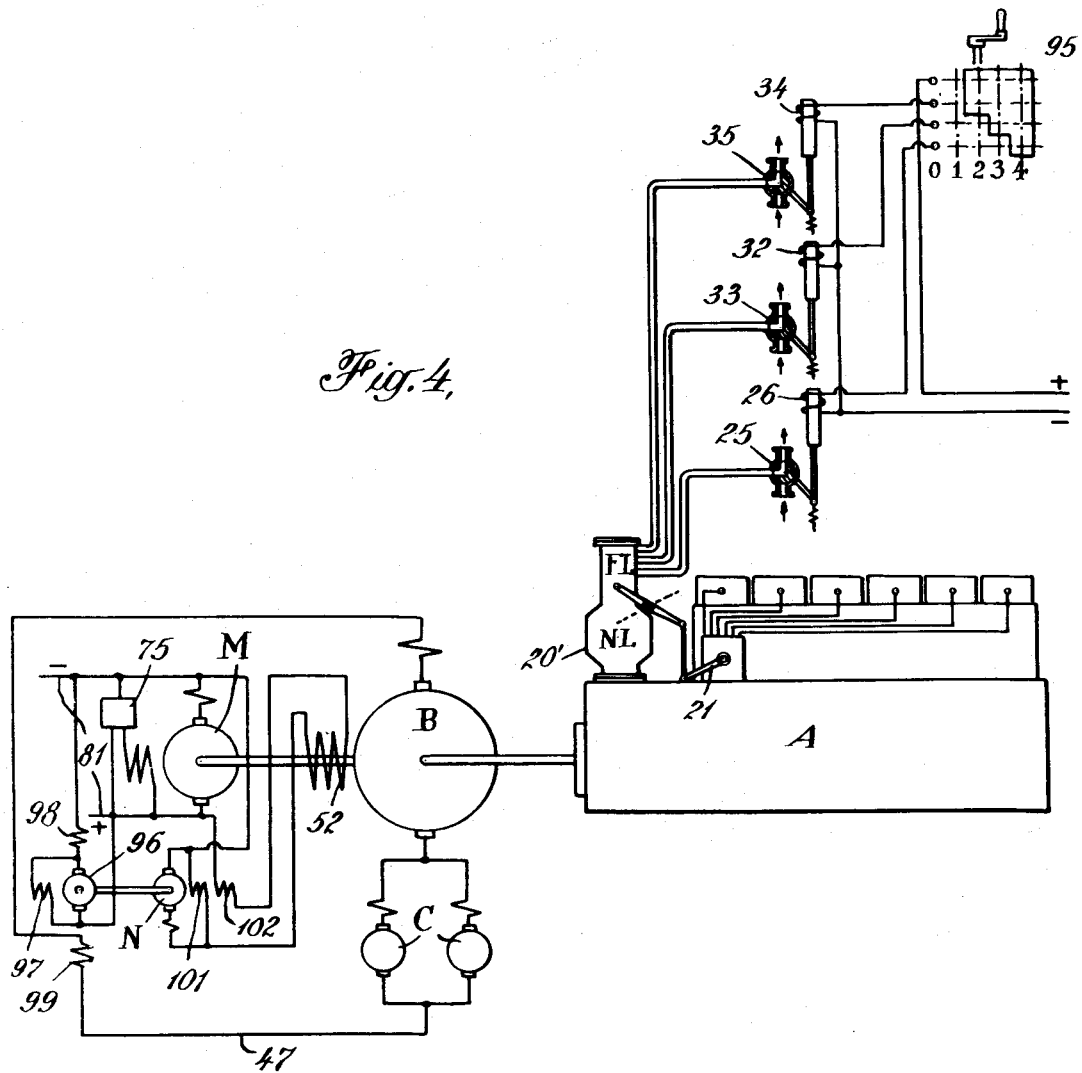
Figure 4 is the diagram of a plant in which the voltage of the generator is adjusted in dependence on the generator current.

If starting is to be effected at highest output and greatest tractive force, the driver turns the controller 46 to the position 4. The segment 46'' closes the circuit for the winding 44, the winding 45 is without current and the control drum 39 turns in the direction of the arrow 59. In the position 1, it is switching in the exciting contactor 41 by the segment 39' via the line 40, so that the generator B is excited. Simultaneously with the closing of the exciting circuit 43, the contactor 41 is closing the contacts 41'. Thereby the coil of the contactor 41 receives current via the conductor 42 in the positions 2 and 3 of the control drum 39. In the position 2 of the control drum 39, the solenoid 26 receives current via the segment 39'' and brings the spring 22 into action; the spring 22 being so adjusted that the engine A works with the speed $n_2$ (Fig. 1). In the position 3 the solenoid 32 receives current and brings the spring 23 into action; the spring 23 being so adjusted, that the engine works with the speed $n_3$ (Fig. 1). Thereby the combustion engine A is adjusted to different operating speeds. For each additional operating speed $n_4$, $n_5$, $n_6$, Fig. 1, an additional spring is to be brought into action in the same way (Figs. 3 and 4).

On closing the contactor 41 and the generator B being excited, the combustion engine A is loaded so that the governor 20 lifts the slide valve 55 out of the no load position. Through the port 60 compressed air or pressure oil enters from any source and via the port 61 gets below the piston 58. The latter is pressed upward and the pressure medium in the upper space of the cylinder 57 flows off through the port 62 which opens into a free discharge. At full load the slide valve 55 closes the ports 61 and 62 and accordingly shuts off the supply of compressed air to the servomotor 57. If the speed falls still further, then pressure medium flows from the port 60 to the port 62 to the upper side of the piston 58 and at the resistance 53 stages will be inserted until the adjusted full load output of the combustion engine A is reached.

If the current in the armature circuit 47 exceeds a definite permissible value, then the relay 48 is attracted as a blocking element for further switching in of regulating springs. This makes the winding 44 currentless, so that the motor 38 can not turn the control drum 39 any further and its next higher stage cannot be connected in until the current has again sunk to or below its permissible value; thereby an endangering of the generator B is prevented.

In consequence of the relay 48, the device (25 to 39) for connecting in and disconnecting the regulating springs 22 and 23 of the speed governor 20 works in dependence on a characteristic magnitude of the traction operation. In addition to blocking the control drum 39 when the permissible current value is reached, one must also prevent the excitation of the generator B from being increased by further reduction of the resistance 53. For this purpose, the relay 49 is provided which is attracted at a second current value lying somewhat above that permissible for the relay 48, and closes the circuit 64 containing the solenoid 65, which turns the valve 66, so that pressure medium from the inlet 67 connected to the pressure medium source enters the cylinder 57 via the piston 58, independent of the position of the slide valve 55. Even if the port 61 should still be connected to the port 60, no additional stages of the resistance 53 can be connected in, because the piston 58 does not move since the pressure is equal on both sides.

The relay 50 which is attracted at a third current value lying somewhat above the second current value closes the circuit 68 of the solenoid 69. This turns the valve 70 so that the cylinder 57 is connected below the piston 58 with the discharge 71 independent of the slide valve 55. Now the piston 58 falls, being loaded from the top by pressure medium and by insertion of more stages of the resistance 53 the excitation of the generator B and the current in the circuit 47 are lessened until the relay 50 again drops. The relay 50 will come into operation especially when, on passing over from one speed to the next higher speed, the voltage suddenly increases strongly so that a high excess current is caused unless the excitation is decreased.

The valves 66 and 70 can also be actuated by means of the controller 46. In its position 2, the solenoid 73 of the valve 66 is excited, so that the piston 58 comes to a stop as described, just when it is moving upwards, for example, when full load of the combustion engine A has not yet been reached. The excitation can thereby only reach a certain value. The driver switches the controller 46 to position 2, for example, when he does not want to travel at full load because the maximum speed of the vehicle has been reached or a reduction of speed is prescribed. If the driver wishes to reduce the excitation of the generator B for the purpose of lowering the speed of the vehicle, then he places the controller 46 in the position 1, so that the solenoid 74, in addition to the solenoid 73, receives current and the valve 70 opens the discharge of the pressure medium.

At the switch 46, the position 1 can be left out under certain circumstances in order to prevent the driver, for the purpose of reducing the tractive output, from contenting himself with lowering the output of internal combustion engine by weakening the excitation, while maintaining the speed, even if the combustion engine would produce sufficient output for the traction conditions present at that particular time, at the next lower operating speed. That would be especially proper if a large number of operating speeds is provided because thereby there is also obtained a sufficient graduating of the traction stages even if at each speed traveling can be done only at full load.

The five switching positions of the controller 46 have the following meaning:

| Stage | Speed | Excitation |
|---|---|---|
| 4 | Rises to $n_{max}$ | Rises to full load. |
| 3 | Remains constant | Rises to full load. |
| 2 | Remains constant | Remains constant. |
| 1 | Remains constant | Falls. |
| 0 | Falls | Falls. |

In order to be able to keep the voltage of the exciter machine D constant at the different speeds determined by the putting in action of the springs 22 and 23, there is provided the voltage regulator 75, the coil 77 of which controls the contact 78 of the resistance 79 in the excitation circuit 80 of the exciter machine D in dependence on the voltage of the exciter machine D. At the higher speeds more resistance is connected in. The auxiliary services are inserted in the circuit 81.

In Fig. 3, the operating of the vehicle is still further simplified. The driver with the control switch 82 in the upper position switches in the winding 45 of the motor 38 which turns the control drum 83 in the direction of the arrow 59. In the lower position, when the winding 44 is connected in, the control drum 83 is turned in the direction opposite to the arrow 59. On turning the control drum 83 in the direction of the arrow 59 from 0 to 1, the segment 83' closes the circuit 40 of the exciting contactor 41. In the positions 4, 6 and 8, the segment 83'' closes the circuit for the solenoids 26, 32 and 34, whereby, as described in Figure 2, springs are brought into action on the governor 20' and the corresponding operating speeds of the combustion engine A are adjusted. The control switch 82 or the control drum 83 serve not merely to set the different operating speeds of the combustion engine A, but actuate besides the adjusting device 84 to 93 for the adjusting of the torque of the combustion engine A. The sleeve 84 with the ports 85, 86 and 87 surrounds the slide valve 55 and is actuated by means of the lever 88. On the left end of the lever 88 act the armatures of the solenoids 89 to 92, the circuits of which, in the positions 2, 3 and 7 of the control drum 83, are closed by the contact segment 83'''. The attracted armature of the solenoid 89 presses the left end of the lever 88 downwards and lifts the upper edge of the sleeve 84 from E to F. The stroke of the armatures of the solenoids 90 to 92 is so dimensioned that the sleeve 84 is lifted respectively up to G, H and K. The spring 93 engaging on the right arm of the lever 88 pulls the sleeve 84 downwards when the solenoids are de-energized. The pressure medium flows from the port 60 through the port 85 into the inside of the sleeve 84 between the two pistons of the slide valve 55. It is supposed now that the engine is running, so that pressure for the fluid operated piston 58 is available. As long as the switch 83 is on position 0 with switch 82 in the upper or neutral position the exciting contactor 41 is open, so that the generator B is not excited. The combustion engine therefor is running idle, the governor 20' is at no-load position, the slide valve 55 at its lowest point. As none of the magnets 89—92 is excited at position 0 of the switch 83 the spring 93 is pulling down the lever 88, so that the sleeve 84 is also in lowest position. In the lowest position of the sleeve 84, shown in the drawings, these ports 86 and 87 lie still somewhat lower than the slide valve 55 in the no load position, so that pressure oil enters the cylinder 57 above the piston 58 through the ports 87 and 62 and the piston is pressed entirely downward so that all the stages of the resistance 53 are inserted in the circuit 43. In order to start the vehicle the switch 82 has to be brought in the lower position, thus feeding the motor 38 through relay 48 and exciting winding 44. The switch 83 thus is turned gradually to position 1-8 by the motor 38, if the latter is not stopped by relay 48. At position 1 of switch 83 the exciting contactor 41 is closed, whereby the generator B is excited and the combustion engine loaded. As soon as the generator B loads the combustion engine A above the power requirements for no load, the slide valve 55 rises and the ports 87 or 62 are opened still more, whereby the piston 58 first of all continues in its low position, until when further accelerating the vehicle at positions 2, 3, 5 and 7 of the switch 83 the magnets 89 to 92 are excited so that a displacement of the sleeve 84 is effected to such an extent that now pressure oil enters the cylinder 57 on the lower side of the piston 58 and the last stages of the resistance 53 are cut out. The sleeve 84 has at both ends a free discharge for the pressure oil issuing from the cylinder 57. If the sleeve 84 is raised into one of the positions F, G, H and K, then there takes place, under the influence of the governor 20', the opening of the fuel regulating element 21 corresponding to the positions F, G and H or the corresponding torque of the combustion engine A. In the positions F, G and H, the slide valve 55 only closes the ports 86 and 87 at larger fuel feeds and torques than correspond to no load, and in the highest position K of the sleeve 84 only at full load. Each position of the sleeve 84, therefore, corresponds to a definite fuel feed and a definite torque. The motor 38 just as in Figure 2, works in dependence of the current in the circuit 47, as the relay 48 is inserted in the current lead to the winding 44.

Acceleration can be stopped at any time by the driver by turning the switch 82 into the neutral position, so that switch 83 is stopped at one of the intermediate positions. If the vehicle should run at a reduced speed switch 82 for a short period is brought to the upper position so that the motor 38 is turning the switch back in the direction of the arrow. After some seconds switch 82 is again turned in neutral position so that switch 83 is stopping on one of the lower positions. Therefore one of the magnets 89, 90 or 91 is excited or all magnets are cut out, so that the sleeve 84 is kept at one of the lower positions E—H, whereby a lower torque of the combustion engine A is maintained. Similarly one of the lower valves 25 and 33 or no valve at all are closed so that the Diesel engine is running at reduced speed. For stopping the vehicle the switch 82 is kept in the upper position until the motor 38 has turned the switch 83 back to 0-position, where the excitation contactor 41 is cut out and the load taken off, the combustion engine then running idle again.

If the highest permissible governor position is not the same for all speeds, the sleeve 84 can be correspondingly displaced when adjusting different speeds; for example, the lever 88 can be connected by the rod 103 to the piston 31 of the governor 20 (Figures 2 and 5) or the sleeve 84 can be displaced by itself by means of solenoids or the like, as shown in Figure 3.

Also the actuation of the valves 66 and 70 by the relays 49 and 50 is the same as in Figure 2, and the current values in the armature circuit 47, at which the relays 48, 49 and 50 are attracted or drop, are graduated in stages in the same way. The voltage regulator 75 works also in the same way.

In Figure 4, the switch 95 merely actuates the adjustment of the speeds of the combustion engine A by means of the solenoids 26, 32 and 34 and the valves 25, 33 and 35, in which the arrows indicate inflow and outflow of the pressure medium. The maintaining constant of the adjusted output of the combustion engine A however, is effected in Figure 4 in such a way that the device regulating the voltage of the generator B is adjusted in dependence on the generator current. The auxiliary generator M, which likewise is driven by the combustion engine A, is regulated to constant voltage at the different operating speeds by means of the voltage regulator 75. The auxiliary generator M, which serves to feed the auxiliary services, furnishes the current for the shunt motor 96, which drives the exciter machine N, which feeds the excitation winding 52 of the generator B. The motor 96 has, in addition to the shunt winding 97 and the series winding 98, also an additional exciting winding 99 inserted in the circuit 47 of the generator B and of the driving motors C. For exciting the exciting machine there serves, along with the series and shunt windings 100 and 101, the winding 102 fed by the auxiliary generator M.

With increasing current intensity in the armature circuit 47 of the generator B, the winding 99 strengthens the field of the motor 96 in such a way that the speed of the motor 96 falls. Thereby the speed of the exciter N and accordingly, the excitation of the generator B also fall, and with suitable co-ordination of the windings 97 to 102 and 52, this is accomplished in such a way that the combustion engine A maintains its constant output.

The switches 39 and 83 must in every case stop in definite positions. In order that, on turning the switch, an intermediate position of the motor 38 is made impossible, stop devices or the like are provided, such as are known for the step switch drive in alternating current vehicles and for controller drive in direct current vehicles.

I claim:

1. In a vehicle drive control system, in combination with an internal combustion engine, an electric generator driven thereby and traction motors electrically connected to the generator, control means comprising a speed governor driven by said engine and controlling the fuel supply thereto, a plurality of springs for variably controlling the response of said governor to the engine speed, means for selectively bringing said springs into operation during a change from one operating speed to another and generator voltage regulating means for maintaining the power output of said engine approximately constant at each selected speed.

2. In a vehicle drive control system, in combination with an internal combustion engine, an electric generator driven thereby and traction motors electrically connected to the generator, control means comprising a speed governor driven by said engine and controlling the fuel supply thereto, a plurality of springs for variably controlling the response of said governor to the engine speed, means for selectively bringing said springs into operation during a change from one operating speed to another, means controlled by said speed governor for varying the excitation of said generator to maintain the power output of said engine constant at each selected speed.

3. In a vehicle drive control system, in combination with an internal combustion engine, an electric generator driven thereby and traction motors electrically connected to the generator, control means comprising a speed governor driven by said engine and controlling the fuel supply thereto, a plurality of springs for variably controlling the response of said governor to the engine speed, means for selectively bringing said springs into operation during a change from one operating speed to another, means responsive to changes in the generator current for varying the generator voltage to maintain the power output of said engine approximately constant at each selected speed.

4. In a vehicle drive control system, in combination with an internal combustion engine, an electric generator having a drooping voltage characteristic driven thereby and traction motors electrically connected to the generator, control means comprising a speed governor driven by said engine and controlling the fuel supply thereto, a plurality of springs for variably controlling the response of said governor to the engine speed, means for selectively bringing said springs into operation during a change from one operating speed to another and generator voltage regulating means for maintaining the power output of said engine approximately constant at each selected speed.

5. In a vehicle drive control system, in combination with an internal combustion engine, an electric generator driven thereby and traction motors electrically connected to the generator, control means comprising a speed governor driven by said engine and controlling the fuel supply thereto, means for adjusting said governor to selectively operate said engine at any one of a plurality of predetermined limited speed ranges, means responsive to electrical conditions in the circuit of said traction motors for preventing the adjustment of said governor to a higher speed range under excessive tractive load conditions and governor responsive generator voltage regulating means for maintaining the power output of said engine approximately constant at each selected speed range.

6. In a vehicle drive control system, in combination with an internal combustion engine, an electric generator driven thereby and traction motors electrically connected to the generator, control means comprising a speed governor driven by said engine and controlling the fuel supply thereto, means for adjusting said governor to selectively operate said engine at any one of a plurality of predetermined limited speed ranges, means for varying the voltage of said generator, means connecting said governor to control said generator voltage varying means at each of said selected speed ranges and means for adjusting said connection between said governor and said generator voltage varying means to vary the torque of said engine at said several predetermined speed ranges.

7. In a vehicle drive control system, in combination with an internal combustion engine, an electric generator driven thereby and traction motors electrically connected to the generator, control means comprising a speed governor driven by said engine and controlling the fuel supply thereto, means for adjusting said governor to selectively operate said engine at any one of a plurality of predetermined limited speed ranges, a circuit for supplying excitation current to said generator, means controlled by said governor for varying the current in said circuit in accordance with changes in the engine speed whereby the load on said engine is maintained approximately constant at each selected speed range, and means for modifying the control of said excitation current varying means by said governor whereby the torque of said engine may be varied.

8. In a vehicle drive control system, in combination with an internal combustion engine, an electric generator driven thereby and traction motors electrically connected to the generator, control means comprising a speed governor driven by said engine and controlling the fuel supply thereto, means for adjusting said governor to selectively operate said engine at any one of a plurality of predetermined limited speed ranges, means for varying the voltage of said generator, means connecting said governor to control said generator voltage varying means at each of said selected speed ranges, means for adjusting said connection between said governor and said generator voltage varying means to vary the torque of said engine at said several predetermined speed ranges, and a single control device connected to control both said governor adjusting means and said connection adjusting means.

9. In a vehicle drive control system, in combination with an internal combustion engine, an electric generator driven thereby and traction motors electrically connected to the generator, control means comprising a speed governor driven by said engine and controlling the fuel supply thereto, means for adjusting said governor to selectively operate said engine at any one of a plurality of predetermined limited speed ranges, generator voltage regulating means for maintaining the power output of said engine approximately constant at each of said selected speed ranges and means responsive to electrical conditions in the circuit connecting said generator to said traction motors for preventing an increase in the voltage of said generator by said voltage regulating means.

10. In a vehicle drive control system, in combination with an internal combustion engine, an electric generator driven thereby and traction motors electrically connected to the generator, control means comprising a speed governor driven by said engine and controlling the fuel supply thereto, means for adjusting said governor to selectively operate said engine at any one of a plurality of predetermined limited speed ranges, generator excitation regulating means controlled by said speed governor for maintaining the power output of said engine approximately constant at each selected speed range, and means responsive to electrical conditions in the circuit connecting said generator to said traction motors for preventing an increase in the excitation of said generator by said regulating means.

11. In a vehicle drive control system, in combination with an internal combustion engine, an electric generator driven thereby and traction motors electrically connected to the generator, control means comprising a speed governor driven by said engine and controlling the fuel supply thereto, means for adjusting said governor to selectively operate said engine at any one of a plurality of predetermined limited speed ranges, generator voltage regulating means operated by said speed governor for maintaining the power output of said engine approximately constant at each selected speed range, and means responsive to excessive tractive loads on said vehicle for operating said generator voltage regulating means to reduce the generator voltage.

12. In a vehicle drive control system, in combination with an internal combustion engine, an electric generator driven thereby and traction motors electrically connected to the generator, control means comprising a speed governor driven by said engine and controlling the fuel supply thereto, means for adjusting said governor to selectively operate said engine at any one of a plurality of predetermined limited speed ranges, generator voltage regulating means operated by said speed governor for maintaining the power output of said engine approximately constant at each selected speed range, and means for discontinuing the operation of said voltage regulating means by said speed governor when said governor adjusting means is operated to reduce the speed of said engine.

OSKAR SCHLÄPFER.